Aug. 4, 1959 L. W. SHUGER 2,897,732
HIGHWAY MARKER COMPRISING UNSATURATED ALKYD RESIN
AND GLASS BEADS AND METHOD OF MAKING SAME
Filed Dec. 22, 1955
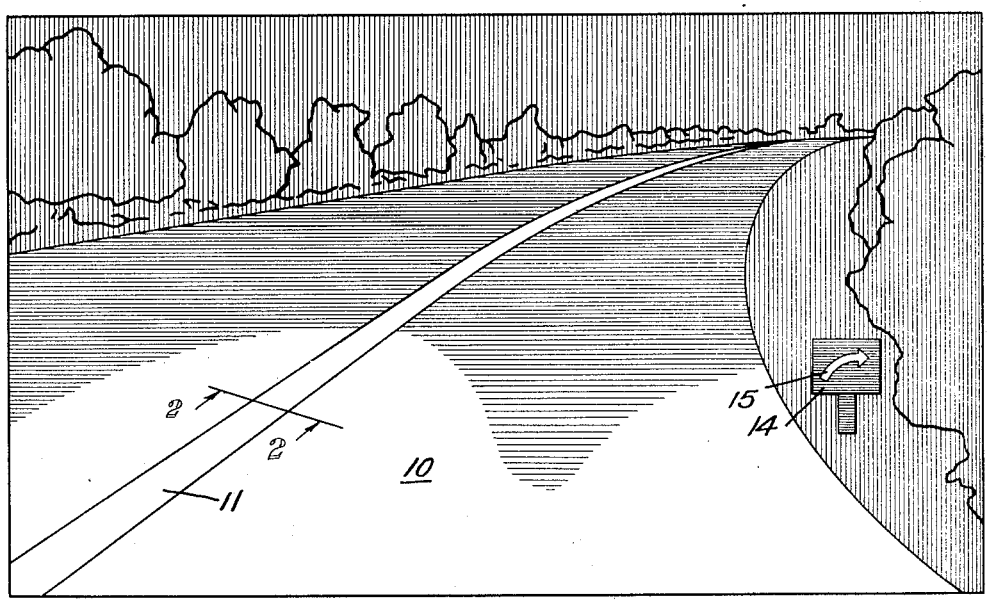
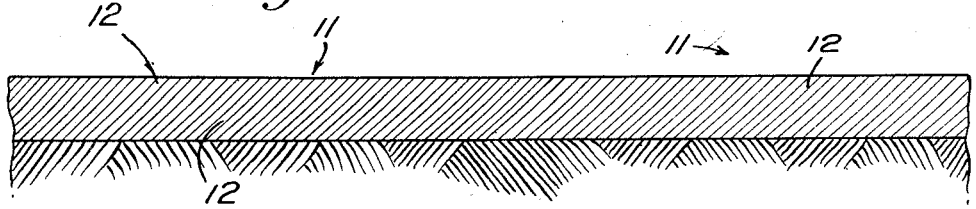
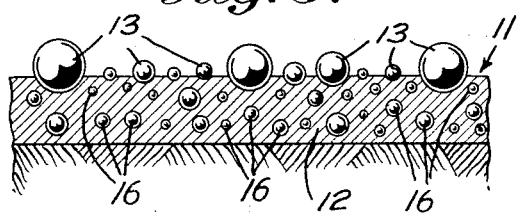 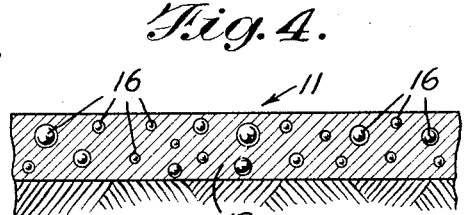
INVENTOR
Leroy W. Shuger,
BY Karl W. Flocks
ATTORNEY United States Patent Office 2,897,732
Patented Aug. 4, 1959

2,897,732

HIGHWAY MARKER COMPRISING UNSATURATED ALKYD RESIN AND GLASS BEADS AND METHOD OF MAKING SAME

Leroy W. Shuger, Baltimore, Md., assignor to Baltimore Paint & Color Works, Baltimore, Md., a firm Application December 22, 1955, Serial No. 554,870

11 Claims. (Cl. 94—1.5)

This invention relates to surface marking, and more particularly to markings embodying a quick drying traffic paint of increased film thicknesses that have essentially the same wet and dry film thicknesses.

Conventional markers heretofore extensively used are made from paints which utilize solvents, which must evaporate off to yield a dry film of the paint. It has been common practice to lay small glass spheres onto the paint when the latter is in a semi-dry or tacky condition to reflectorize the marker.

It has now been found most desirable to secure the maximum wet film thickness practicable in order to obtain the maximum dry film thickness for greater durability.

Conventional traffic paints now in use, particularly if they are used with the glass beads for surface dressing, are recommended for application with a wet film thickness of 15 mils. Anything less than this usually gives bad bead retention. If the wet film thickness were increased above 15 mils, the conventional paint film would not dry in the required time for efficient usage. A conventional paint which would normally dry in three-quarters of an hour, when applied at 15 mils wet film thickness, would require approximately three hours or more to dry if applied at 30 mils wet film thickness.

It has not been easy in the past to obtain increased wet film thicknesses above 15 mils because at such increased film thicknesses the paint flows over the edges, and the edges are not sharp.

An important consideration is the dry film thickness of conventional traffic paints that actually remains on the road. After the solvent has evaporated and the remaining dry ingredients undergo some shrinkage, the dry film thickness of conventional paint is approximately 44–70% of the wet film thickness. In other words, when conventional traffic paints are applied at 15 mils wet film thickness, the dry film is approximately 6.6–10.5 mils thick.

The need has long existed for a marker of greater film thickness that could be conveniently applied to the roadway, that would be durable and adherent to glass spheres.

It is therefore an object of the present invention to provide a marker wherein the reflecting paint is of such a peculiar and critical nature that it has essentially the same wet and dry film thickness, is quick drying and will yield markers of greater film thickness.

It is a further object of the present invention to provide a marker including a reflecting paint and a series of auto-collimating units wherein the reflecting paint is of such a nature as to tenaciously hold the auto-collimating units to the marker.

It is a still further object of the present invention to provide an improved traffic paint that may be applied in greater film thicknesses and yet is quick drying.

It is a still further object of the present invention to provide an improved traffic paint that has essentially the same wet and dry film thicknesses.

It is a still further object of the present invention to provide an improved traffic paint wherein the use of solvents is substantially eliminated to yield a quick drying paint having essentially the same wet and dry film thicknesses.

Another object of the present invention is to provide an improved traffic paint that may be applied without the use of solvents or requiring heating above substantially atmospheric temperature.

Another object of the present invention is to provide an improved traffic paint that dries quickly without surface tack and may be applied at substantially atmospheric temperatures.

Another object of the present invention is to provide an improved traffic paint that can be applied to road surfaces utilizing essentially conventional line striping equipment.

Another object of the present invention is to provide a quick drying traffic paint that is highly adherent to glass spheres dropped onto the wet surface thereof.

A still further object of the present invention is to provide an improved marker that is an inert chemically resistant film impervious to weathering and having great durability.

Other objects and the nature and advantages of the invention will be apparent from the following description taken in conjunction with the accompanying drawings, wherein:

Fig. 1 is a view in perspective of a highway and a pair of markers associated therewith in accordance with the invention;

Fig. 2 is a view in section taken along the line 2—2 of Fig. 1 and looking in the direction of the arrows of a marker without the glass beads;

Fig. 3 is a similar view of a marker having glass beads embedded therein with some of the beads completely embedded and some of the beads partially exposed; and Fig. 4 is a similar view of a marker having glass beads embedded therein with all of the beads completely embedded.

Referring to the drawings, a road surface 10 has a center line 11 applied thereto fabricated of a binder or paint 12 including ingredients such as specified later in detail. Fig. 2 shows a cross-section of the marker having no glass spheres therein. Fig. 3 shows a cross-section of a marker having a plurality of glass spheres 16 completely embedded therein and a plurality of glass spheres 13 partially embedded with their upper surfaces exposed. Fig. 4 shows a marker with the completely embedded spheres 16 only. At the side of the road is located a vertical sign 14 bearing a curved arrow insignia 15 indicating a turn in the road. The insignia 15 includes a binder or paint and a series of more or less embedded auto-collimating units such as, for example, relatively small glass spheres.

The marker in accordance with this invention may be fabricated by applying to the surface to be marked at approximately atmospheric temperature a binder or paint, which application may be made by spraying, brushing, dipping or otherwise coating. When auto-collimating units are dropped in for reflectivity, while the marker is in a wet, semi-wet, or tacky condition, the auto-collimating units are distributed over the surface thereof, either by hand or with a mechanical dispenser. The paint is then permitted to dry and hold the auto-collating units. Those units which are partially exposed will serve to effect the reflection of light back to the source emanating light thereto.

Th quick drying, resistant, adherent and durable film is obtained by using a traffic paint containing essentially a polyester resin and a vinylidene monomer copolymerizable therewith in combination with a pigment, filler, a reaction promoter and a curing catalyst.

The polyester resin as used in this specification and claims refers to reaction products of dihydric alcohols, such as glycols, and dibasic acids, one of the dibasic acids must be ethylenically unsaturated, usually introduced as maleic or fumaric acid. The unsaturated polyester reaction products are mixed with an unsaturated reactive monomer, such as styrene, vinyl toluene, vinyl acetate, methyl methacrylate, alpha and para methyl styrene, divinyl benzene, ethylacrylate, acrylonitrile, diallyl phthalate, and many others, or other unsaturated reactive materials that are compatible with the polyester.

The mixture of polyester resins and the vinylidene monomers copolymerizable therewith described above will copolymerize under the influence of heat and/or a peroxide catalyst, with the monomer or other material cross linking the unsaturated polyester to make a thermosetting solid.

The properties of the copolymerizable mixture can be modified through the use of various dibasic acids, different glycols, and several monomers, each in varying ratio to the others, permitting preparation of end products with almost any desired properties. These copolymerizable mixtures are mobile liquids and can be converted quickly to solids. They are 100% reactive and evolve no gas or liquid during curing. A specific example of a suitable copolymerizable mixture found suitable is the reaction product of

|  | Pounds |
|---|---|
| Propylene glycol | 974 |
| Phthalic anhydride | 888 |
| Maleic anhydride | 588 |

Approximately 2200 lbs. of unsaturated polyester reaction product is obtained to which is added 1083 lbs. styrene, or a ratio of 2 parts reaction product to 1 part styrene. Approximately 0.3 lb. hydroquinone and 0.1 lb. butylcatechol is added to act as a stabilizer, and antioxidant, to improve the shelf life of the product.

Expressed in mol percent, approximately 5 to 50% of reactive monomer or other material can be added, and the mol percent of glycol is usually greater than the combined mol percents of the acids used.

A specific example of a suitable traffic paint in accordance with this invention is as follows:

*Example 1*

|  | Parts by wt. |
|---|---|
| Mixture of polyester-resin and monomer | 773.0 |
| Vinyl toluene | 77.3 |
| 6% cobalt naphthenate | 8.7 |
| Titanium dioxide (rutile) | 96.5 |
| Mica | 96.5 |
|  | [1] 1052 |
| Lupersol DDM | 19.3 |

[1] Equals 100 gals.

By percentage this formula is as follows:

|  | Percent |
|---|---|
| Polyester resin | 48.99 |
| Styrene | 24.51 |
| Vinyl toluene | 7.35 |
| Cobalt naphthenate | .80 |
| Pigment | 18.35 |
|  | 100.00 |
| Peroxide catalyst | 1.84 |

The preferred range of ingredients for traffic paints in accordance with this invention is as follows:

|  | Percent |
|---|---|
| Mixture of polyester resin and reactive monomer | 54–81 |
| Vinyl toluene | 6.5–8.1 |
| Cobalt naphthenate | .6–.9 |
| Pigment | 10–40 |
| Peroxide catalyst | 1.3–2.6 | or expressed as total monomer is as follows:

|  | Percent |
|---|---|
| Polyester resin | 36–54 |
| Unsaturated monomer | 24.5–35.1 |
| Cobalt naphthenate | .6–.9 |
| Pigment | 10–40 |
| Peroxide catalyst | 1.3–2.6 |

Suitable traffic paints for certain purposes can be made up from the following range of ingredients:

|  | Percent |
|---|---|
| Polyester resin | 18–57 |
| Unsaturated monomer | 11–58.5 |
| Cobalt naphthenate | Up to 7 |
| Pigment | 5–70 |
| Peroxide catalyst | 0.5–10 |

These formulas result in a fluid product and require no special processing. The pigment and filler is dispersed in the copolymerizable mixture using conventional equipment, preferably a pebble mill. To the pigment-resin paste is added the balance of the resin, vinyl toluene, and cobalt naphthenate and the mixture is mixed well for at least thirty minutes. The Lupersol is the curing catalyst, and is not added to the paint until the time of application.

The paint is preferably applied by spraying, using a catalyst type gun similar to those manufactured by Binks and De Vilbiss companies. Using this type of gun, the catalyst is introduced into the formula outside of the spray gun. The coating can be applied at a wet film thickness of 10 to 30 mils and dries to allow traffic to proceed in less than the fastest drying times for conventional traffic paints which are stated to be 1 hr. Such films have been applied up to 70 mils thick. Raising the temperature of the coating to 100–120° F. just prior to application decreases the cure time considerably. The dry film thickness of this marker is approximately the same as the wet film thickness, except for the minor shrinkage due to the curing of the resin. Glass spheres may be applied to the surface of the marker prior to completion of the curing of the resin.

The pigment is used to impart reflection to the marker as well as color and opacity, and the fillers impart structural strength to the film. To produce a white marker, it is necessary to have a prime pigment, such as the rutile titanium dioxide, to furnish the necessary whiteness and opacity. In place of the rutile titanium dioxide, anatase titanium dioxide can be substituted. The titanium dioxide can be extended with barium sulphate, calcium sulphate, magnesium silicate, zinc sulphide and normal or high strength lithopones to produce a white marker. For colored markers other than white, the following pigments are suitable: lead chromates, zinc chromates, siennas, umbers, iron oxides, inorganic or organic reds. Fillers or extenders, which may be used are, for example: Asbestine (magnesium silicate), diatomaceous silica, amorphous and crystalline silica, micaceous materials, barium sulphate, whiting, wollastonite and pumices.

The vinyl toluene in Example 1 acts to adjust the viscosity of the mixture; however, unlike the solvents in conventional paints, the vinyl toluene copolymerizes with the unsaturated polyester resin to maintain close to 100% solids. The vinyl toluene may be replaced with other unsaturated monomers, such as: vinyl acetate, styrene, methyl methacrylate, alpha and para methylstyrene, divinyl benzene, ethyl acrylate, acrylonitrile, diallyl phthalate, diallyl esters, and others, or other unsaturated reactive materials that are compatible with the polyester.

The cobalt naphthenate is 6% metal and acts as an initiator to speed the reaction. The cobalt naphthenate can be replaced with alkyl mercaptan.

The Lupersol DDM acts as the catalyst to catalyze the polymerization of the modified polyester resin in the final dry film. Lupersol DDM is 60% methyl ethyl ketone peroxide in dimethyl phthalate. Other peroxide type catalysts may be substituted such as benzoyl peroxide and tertiary butyl hydro peroxide.

*Example 2*

| | Parts by weight |
|---|---|
| Mixture of polyester resin and reactive monomer (Vibrin 114) | 890 |
| Cobalt naphthenate | 8.5 |
| Titanium dioxide | 71.0 |
| Magnesium silicate | 43.5 |
| Diatomaceous silica | 22.0 |
| | ¹ 1035.0 |
| Peroxide catalyst | 2 gals. 10 liq. oz. |

¹ Equals 100 gals.

Vibrin 114 is made by Naugatuck Chemical Co. and is a polyester of a glycol, phthalic anhydride and maleic anhydride mixed with styrene.

This formula can be applied in the cold, is a 100% solids formula and requires no special heating in the method of manufacture and can be shipped as conventional paints. The catalyst is, of course, shipped separately. This material is highly adherent to the glass spheres when used to produce reflectorization.

*Example 3*

The material of Example 2 may include 4½ lbs. of No. 70 mesh glass spheres incorporated into each gallon to provide a premix compound. The glass spheres can also be used as a surface dressing with this formula or any of the others described herein, utilizing the Drop-On or Drop-In process of reflectorization.

The spheres may be incorporated in these formulas as a premix at a ratio of up to 8 lbs. of spheres per gallon of paint. The glass spheres are primarily incorporated to obtain greater structural strength and elasticity of the marker. Due to the permanency of the markers in accordance with this invention, it is not believed that the upper surface of the films will abrade off, certainly not as rapidly as in conventional paints used heretofore. Thus, the surface of the embedded spheres will not rapidly become reflective, and the addition of the partially exposed glass may be desirable to provide reflectorization. Up to 14 lbs. of glass spheres may be utilized for 100 square feet of surface of the marker.

The paint formulas in accordance with this invention have an unusual adhesion to glass. When glass spheres are dropped onto the film prior to curing, it would appear that the partially exposed beads would be lost after a short encounter with traffic; however, heavy trucks, after days of traffic, did not dislodge the partially exposed spheres. Of course, the heavier film thickness of these markers permit greater embedment and even greater bead retention. The range of sizes of glass spheres useful in these markers is greater than could be used previously due to the greater film thickness. For premix purposes also, larger size spheres can be used due to the heavier film thickness applied, the only limitation being that the spheres must be of a size that will enable them to pass freely through a spray gun or other application means. Suitable sizes of spheres that can be used in the premix are S–45, which are 13 mils or smaller, S–70 which are 10 mils or smaller, or practically any size for the drop-in spheres.

It will be obvious to those skilled in the art that various changes may be made without departing from the spirit of the invention and therefore the invention is not limited to what is shown in the drawings and described in the specification but only as indicated in the appended claims.

What is claimed is:

1. A combined highway and surface marker comprising a road adapted to receive automotive traffic, the upper surface of which is coated with a reflecting pigmented composition, said composition consisting substantially entirely of a plurality of small glass spheres having an average diameter up to 13 mils, light reflecting pigment and a resin, said resin comprising the product of the reaction of a polyester resin and a vinylidene monomer copolymerizable therewith which was catalyzed by a peroxide catalyst suitable for catalyzing the reaction, said polyester resin being the reaction product of a dihydric alcohol and an ethylenically unsaturated dicarboxylic acid, the reaction between said polyester resin and said monomer catalyzed by said catalyst occurring on said road surface to form a solid incorporating the glass spheres and pigment adherent to said road surface and resistant to the abrasion of traffic.

2. A combined highway and surface marker in accordance with claim 1, wherein said polyester resin is the product of the reaction of a glycol, phthalic anhydride and maleic anhydride and the reactive monomer is selected from at least one of the group consisting of styrene and vinyl toluene.

3. A combined highway and surface marker comprising a road adapted to receive automotive traffic, the upper surface of which is coated with a reflecting pigmented composition, said composition consisting substantially entirely of a plurality of small glass spheres having an average diameter up to 13 mils, light reflecting pigment, a filler, cobalt naphthenate and a resin, said resin comprising the product of the reaction of a polyester resin and a vinylidene monomer copolymerizable therewith which was catalyzed by a peroxide catalyst suitable for catalyzing the reaction, said polyester resin being the reaction product of a dihydric alcohol and an ethylenically unsaturated dicarboxylic acid, the reaction between said polyester resin and said monomer catalyzed by said catalyst occurring on said road surface to form a solid incorporating the glass spheres and pigment adherent to said road surface and resistant to the abrasion of traffic.

4. A combined highway and surface marker in accordance with claim 3, wherein said polyester resin is the product of the reaction of a glycol, phthalic anhydride and maleic anhydride and the reactive monomer is selected from at least one of the group consisting of styrene and vinyl toluene.

5. A combined highway and surface marker comprising a road adapted to receive automotive traffic, the upper surface of which is coated with a reflecting pigmented composition, said composition at the time of application to the road surface consisting substantially entirely of 36–54% of a polyester resin, 24.5–35.1% of a vinylidene monomer copolymerizable with the polyester resin, .6–.9% cobalt naphthenate, 10–40% light reflecting pigment, 1.3–2.6% of peroxide catalyst, said catalyst being suitable for catalyzing the reaction of said polyester resin and said monomer, and up to 8 lbs. of small glass spheres per gallon of composition, said spheres having an average diameter up to 13 mils, said polyester resin being the reaction product of a dihydric alcohol and an ethylenically unsaturated dicarboxylic acid, the reaction between said polyester resin and said monomer catalyzed by said catalyst occurring on said road surface to form a solid incorporating the glass spheres and pigment adherent to said road surface and resistant to the abrasion of traffic.

6. A combined highway and surface marker in accordance with claim 5, wherein said polyester resin is the product of the reaction of a glycol, phthalic anhydride and maleic anhydride and the reactive monomer is selected from at least one of the group consisting of styrene and vinyl toluene.

7. A method of making a traffic marker which comprises applying a layer of reflecting pigmented composition to a road surface adapted to receive automotive traffic, said composition consisting substantially entirely of a plurality of small glass spheres having an average diameter up to 13 mils, a light reflecting pigment, a polyester resin and a vinylidene monomer copolymerizable with said polyester resin, said polyester resin being the reaction product of a dihydric alcohol and an ethylenically unsaturated dicarboxylic acid, adding a peroxide catalyst to said composition immediately prior to the composition reaching said road surface, said catalyst being suitable for catalyzing the reaction between the polyester resin and the monomer, whereby said polyester resin and said monomer catalyzed by said catalyst react on said road surface to form a solid incorporating the glass spheres and pigment adherent to said road surface and resistant to the abrasion of traffic.

8. A method of making a traffic marker which comprises applying a layer of reflecting pigmented composition to a road surface adapted to receive automotive traffic, said pigmented composition consisting substantially entirely of 36–54% of a polyester resin, 24.5–35.1% of a vinylidene monomer copolymerizable with said polyester resin, .6–.9% cobalt naphthenate, 10–40% light reflecting pigment, and up to 8 lbs. of small glass spheres per gallon of composition, said spheres having an average diameter up to 13 mils, said polyester resin being the reaction product of a dihydric alcohol and an ethylenically unsaturated dicarboxylic acid, adding a peroxide catalyst to said composition immediately prior to the composition reaching said road surface, said catalyst being suitable for catalyzing the reaction of said polyester resin and said monomer, whereby said polyester resin and said monomer catalyzed by said catalyst react on said road surface to form a solid, incorporating said glass spheres and pigment adherent to said road surface and resistant to the abrasion of traffic.

9. A method in accordance with claim 8, wherein said polyester resin is the product of the reaction of a glycol, phthalic anhydride and maleic anhydride and the reactive monomer is selected from at least one of the group consisting of styrene and vinyl toluene.

10. A combined highway surface marker comprising a road adapted to receive automotive traffic, the upper surface of which is coated with a reflecting pigmented composition, said composition consisting substantially entirely of a light reflecting pigment and a resin, said resin comprising the product of the reaction of a polyester resin and a vinylidene monomer copolymerizable therewith which was catalyzed by a peroxide catalyst suitable for catalyzing the reaction, said polyester resin being the reaction product of a dihydric alcohol and an ethylenically unsaturated dicarboxylic acid, and a plurality of small glass spheres having an average diameter up to 13 mils at least partially imbedded in said composition, the reaction between said polyester resin and said monomer catalyzed by said catalyst occurring on said road surface to form a solid incorporating the glass spheres and pigment, adherent to said road surface, and resistant to the abrasion of traffic.

11. A method of making a traffic marker which comprises applying a layer of reflecting pigmented composition to a road surface adapted to receive automotive traffic, said composition consisting substantially entirely of a light reflecting pigment, a polyester resin and a vinylidene monomer copolymerizable with said polyester resin, said polyester resin being the reaction product of a dihydric alcohol and an ethylenically unsaturated dicarboxylic acid, adding a peroxide catalyst to said composition immediately prior to the composition reaching said road surface, said catalyst being suitable for catalyzing the reaction between the polyester resin and the monomer to form a solid material, partially imbedding a plurality of small glass spheres in the upper surface of said composition prior to completion of the solidification thereof, said spheres having an average diameter up to 30 mils, whereby said polyester resin and said monomer catalyzed by said catalyst react on said road surface to form a solid incorporating the glass spheres and pigment, adherent to said road surface and resistant to the abrasion of traffic.

References Cited in the file of this patent
UNITED STATES PATENTS

| | | |
|---|---|---|
| 2,443,740 | Kropa | June 22, 1948 |
| 2,574,971 | Heltzer | Nov. 13, 1951 |